United States Patent
Rizzuto et al.

(10) Patent No.: US 9,770,128 B2
(45) Date of Patent: Sep. 26, 2017

(54) DUAL HEATER COFFEE MAKER

(75) Inventors: Leandro P. Rizzuto, Sheridan, WY (US); Joseph J. Laskowski, Derby, CT (US)

(73) Assignee: CONAIR CORPORATION, Stamford, CT (US)

( * ) Notice: Subject to any disclaimer, the term of this patent is extended or adjusted under 35 U.S.C. 154(b) by 550 days.

(21) Appl. No.: 13/567,504

(22) Filed: Aug. 6, 2012

(65) Prior Publication Data

US 2014/0037808 A1 Feb. 6, 2014

(51) Int. Cl.
*A47J 31/057* (2006.01)
*A47J 31/44* (2006.01)
*F24H 1/12* (2006.01)

(52) U.S. Cl.
CPC ......... *A47J 31/0573* (2013.01); *A47J 31/445* (2013.01); *F24H 1/121* (2013.01); *F24H 2250/02* (2013.01)

(58) Field of Classification Search
USPC ............................................ 392/465; 99/284
See application file for complete search history.

(56) References Cited

U.S. PATENT DOCUMENTS

| | | | |
|---|---|---|---|
| 4,966,070 A * | 10/1990 | Frisch | 99/302 R |
| 5,072,660 A * | 12/1991 | Helbling | 99/280 |
| 6,748,850 B1 * | 6/2004 | Kraan | 99/289 R |
| 7,543,526 B1 * | 6/2009 | Tai | 99/284 |
| 7,543,626 B1 | 6/2009 | Pinkstock et al. | |
| D677,510 S * | 3/2013 | Tetreault | D7/309 |
| 8,479,643 B2 * | 7/2013 | Aemisegger et al. | 99/302 R |
| 8,609,170 B2 * | 12/2013 | Tinkler et al. | 426/431 |
| 2002/0130137 A1 * | 9/2002 | Greenwald et al. | 222/54 |
| 2003/0066431 A1 * | 4/2003 | Fanzutti et al. | 99/279 |
| 2003/0080107 A1 * | 5/2003 | Williamson | 219/433 |
| 2005/0098043 A1 * | 5/2005 | Bruinsma | 99/279 |
| 2006/0090653 A1 * | 5/2006 | McDuffie et al. | 99/279 |
| 2007/0137493 A1 * | 6/2007 | Van Der Meer et al. | 99/279 |
| 2007/0193450 A1 * | 8/2007 | Magg et al. | 99/279 |

* cited by examiner

*Primary Examiner* — Quang D Thanh
*Assistant Examiner* — Renee Larose
(74) *Attorney, Agent, or Firm* — Grogan, Tuccillo & Vanderleeden, LLP

(57) ABSTRACT

The coffee maker of the present invention includes a housing, a water reservoir disposed in the housing and a shower head in fluid communication with the water reservoir. The coffee maker also include a first heating element for heating water from the water reservoir and being controllable between and ON state and an OFF state, and a second heating element located downstream from the first heating element and being controllable between an ON state and an OFF state. The first and second heating elements are operable in at least a first mode and a second mode, the second mode being different from the first mode.

13 Claims, 2 Drawing Sheets

DUAL HEATER COFFEE MAKER

FIELD OF THE INVENTION

The present invention relates to coffee makers and, more particularly, to a heating system for a coffee maker.

BACKGROUND OF THE INVENTION

Various coffee makers exist for brewing coffee. For example, known drip-style coffee makers heat water from a water reservoir and transport the heated water to a shower head where it is distributed over ground coffee in a brewing chamber to produce brewed coffee. The brewed coffee exits the brewing chamber and is collected in a brewed coffee container retained on the base of the coffee maker.

While existing coffee makers are generally suitable for what is regarded as ordinary performance, there is room for improvement in terms of the quality of the coffee produced. In particular, with known drip-style coffee makers, after the water is heated, and before it enters the shower head, the temperature of the heated water decreases due to heat losses to the surrounding area. As a result, the brewed coffee is often not hot enough to suit many users' preferences.

SUMMARY OF THE INVENTION

It is an object of the present invention to provide a coffee maker.

It is an object of the present invention to provide a coffee maker that produces coffee at a sufficiently high temperature.

It is an object of the present invention to provide a coffee maker capable of producing coffee at a variety of temperatures according to a user's preference.

These and other objects are achieved by the present invention.

The coffee maker of the present invention includes a housing, a water reservoir disposed in the housing and a shower head in fluid communication with the water reservoir. The coffee maker also include a first heating element for heating water from the water reservoir and being controllable between and ON state and an OFF state, and a second heating element located downstream from the first heating element and being controllable between an ON state and an OFF state. The first and second heating elements are operable in at least a first mode and a second mode, the second mode being different from the first mode.

DETAILED DESCRIPTION OF THE PREFERRED EMBODIMENTS

Figure 1:
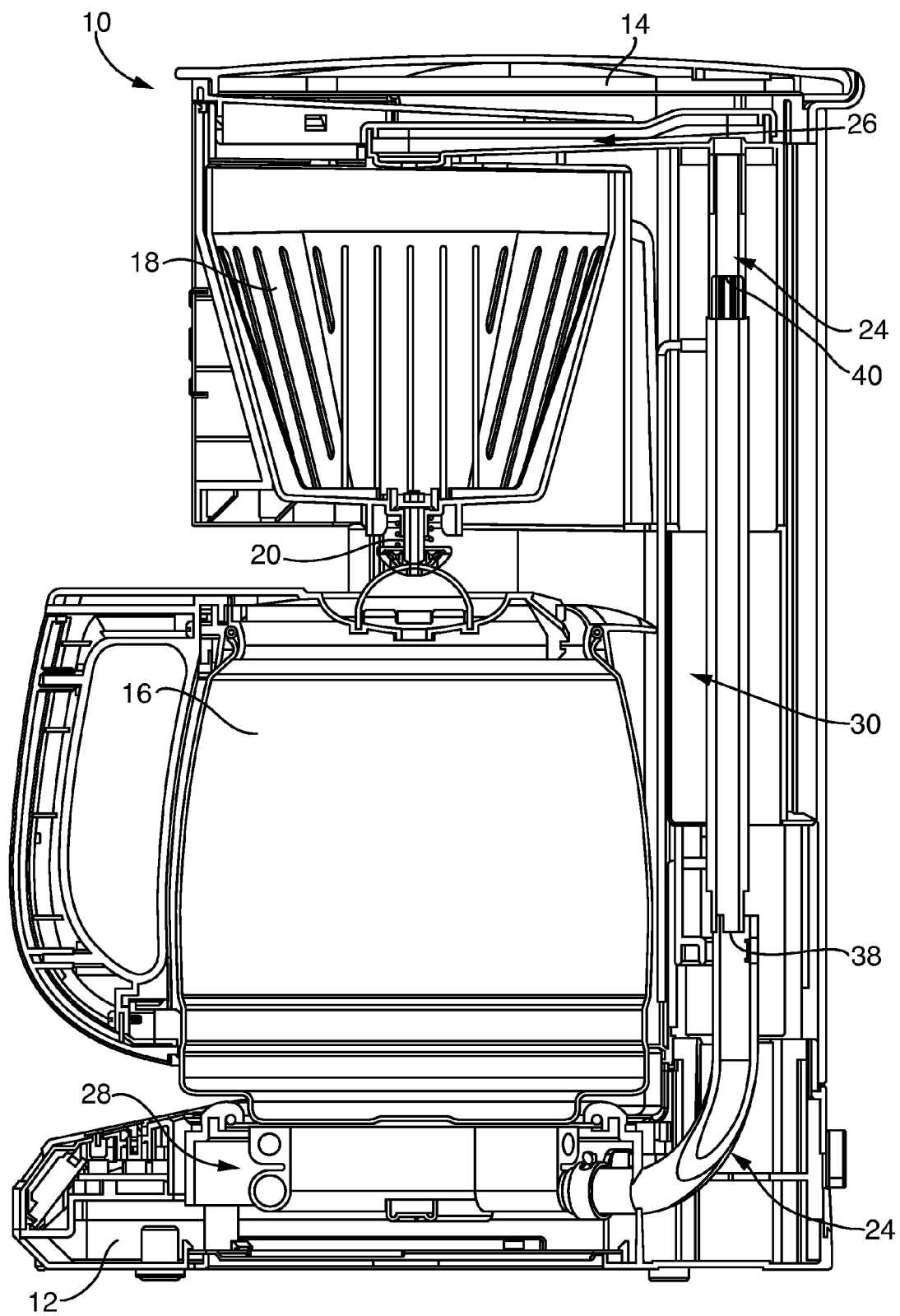
FIG. 1 is a cross-sectional view of a coffee maker having a dual heating system in accordance with an embodiment of the present invention.

Referring to FIG. 1, a coffee maker 10 having a dual heating system is shown. The coffee maker 10 includes a base 12 and a housing 14 connected to the base. As shown therein, the base 12 is adapted to support a brewed coffee container 16 thereon. The housing 14 contains a brewing chamber 18 having an outlet 20 positioned generally above the base 12. The housing 14 also houses a water reservoir 22 and a water supply conduit 24 extending from the reservoir 22 to a shower head 26 positioned above the brewing chamber 18. The coffee maker 10 also includes a pump (not shown) for pumping water from the water reservoir 22, through the supply conduit 24, and to the shower head 26, as discussed hereinafter.

As further shown in FIG. 1, a primary heater 28 is disposed in the base 12. The primary heater 28 is configured to heat water from the water reservoir 22 during operation. In the preferred embodiment, the primary heater 28 is of the type known in the art, such as a 900-1000 Watt heater, although a heater having a higher or lower power rating may also be utilized without departing from the broader aspects of the present invention. Importantly, the primary heater 28 is disposed in the base so that it can keep coffee in the brewed coffee container 16 hot, in addition to heating the water from the water reservoir 22 during brewing. In connection with this, the base 12 may include a thermal plate that the container 16 sits on, capable of transferring heat from the heater 28 to the container 16.

Figure 2:
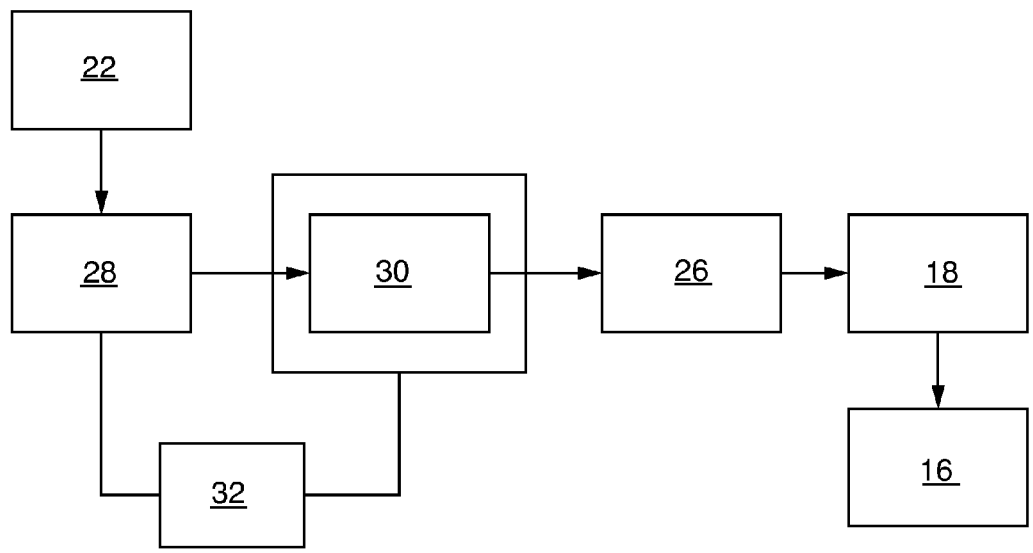
FIG. 2 is a schematic illustration of the dual heating system and brewing cycle of the coffee maker of FIG. 1.

The coffee maker 10 of the present invention also includes a secondary heater 30 disposed in the housing 14 along the water supply conduit 24. In the preferred embodiment, the secondary heater 30 is spliced in the water supply conduit 24. As shown in the schematic illustration of FIG. 2, the primary heater 28 and secondary heater 30 are electrically coupled to, and controlled by, a processor 32, as discussed hereinafter.

Figure 3:
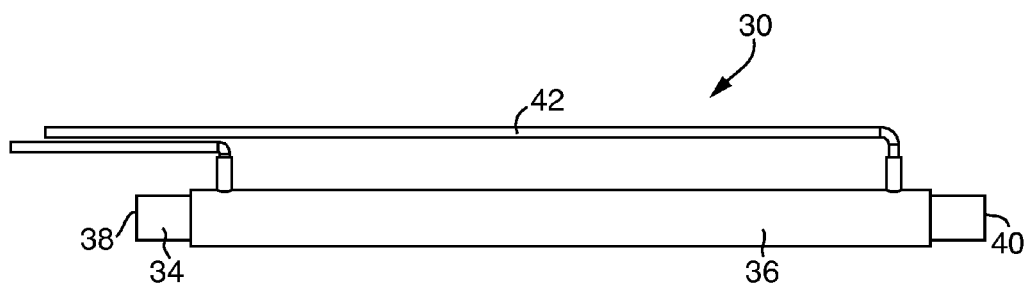
FIG. 3 is side elevational view of a secondary heater of the dual heating system.

With reference to FIG. 3, the secondary heater 30 is preferably a line heater having an extruded aluminum inner tube 34 encased in an outer wall 36 and having an inlet 38 and an outlet 40. Electrical power to produce heat is supplied by a heater wire 42 electrically connected to an electrical power source. In the preferred embodiment, the secondary heater 30 is a 150-200 Watt heater, although heaters having different power ratings may also be utilized without departing from the broader aspects of the present invention.

Referring back to FIG. 2, during operation, water from the water reservoir 22 is pumped through, and heated by, the primary heater 28 in the base 12. The water then travels through the supply conduit 24 and through the secondary heater 30, which heats the water once again to restore any heat lost. Once heated by the secondary heater 30, the water is pumped to the shower head 26, whereby it is distributed over coffee grounds within the brewing chamber 18. The heated water passes through the coffee grounds, out of outlet 20, and collects in brewed coffee container 16.

In connection with the above, the coffee maker 10 is operable in a plurality of modes that are selectable by a user from a control panel (not shown) on the coffee maker. In a first or 'low' mode, once brewing is initiated by a user, such as, for example, by depressing an appropriate button on the control panel, only the primary heater 26 is actuated to heat the water from the water reservoir 22. In the first mode, the secondary heater 30 remains off throughout the brewing process.

In a second or 'hot' mode, as selected by a user, the processor 32, according to a control algorithm, controls the primary heater 28 to its on position for the duration of the brewing cycle, and cycles the secondary heater 30 on and off during the brewing cycle to provide additional heat to the water passing therethrough. In the preferred embodiment, the secondary heater 30 is switched on for a predetermined amount of time, then switched off for a predetermined amount of time. Once the brewing cycle is complete, the processor 32 may control both heaters to their respective 'OFF' positions, or the primary heater 28 may be maintained in its 'ON' position to keep the brewed coffee in the container 16 hot. As will be readily appreciated, by cycling the secondary heater 30 on an off throughout brewing, the coffee brewed will be hotter than coffee brewed under the first or 'low' mode.

In a third or 'extra hot' mode, as selected by a user, the processor 32, according to a control algorithm, controls both the primary heater 28 and secondary heater 30 to their respective 'ON' states throughout the entire brewing cycle. As with the second mode, once the brewing cycle is complete, the processor 32 may control both heaters to their respective 'OFF' positions, or the primary heater 28 may be maintained in its 'ON' position to keep the brewed coffee in the container 16 hot. As will be readily appreciated, by maintaining both heaters 28, 30 in their 'ON' states throughout brewing, the coffee brewed will be even hotter than coffee brewed utilizing the second or 'hot' mode.

Importantly, the secondary heater 30 is controlled by an electro-mechanical means such that the secondary heater 30 may be switched on and off, cycled on an off at a specified frequency, or kept in the on position, with each of these modes resulting in an increase in water temperature at the shower head 26. In the preferred embodiment, the secondary heater 30 is electrically dependent on the primary heater 28, such that the secondary heater 30 is only operable when the primary heater 28 is on.

Advantageously, the coffee maker of the present invention is capable of brewing coffee having a variety of temperatures, according to a user's preference, and depending on the amount of heat that is being lost during the brewing cycle. For example, if a lot of heat is being lost for any given reason, a user can simply select the second mode to cycle the secondary heater on and off to provide some additional heat, or select the third mode to raise the water temperature even more.

While the above-described embodiments relate particularly to a drip-style coffee maker, the present invention is not so limited in this regard. In particular, the dual heating system of the present invention is applicable to any type of coffee maker or brewed beverage appliance that utilizes hot water to produce a beverage.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A coffee maker, comprising:
a base having a thermal plate supporting a container;
a housing connected to the base;
a water reservoir disposed in the housing;
a shower head in fluid communication with said water reservoir via a water supply conduit;
a first heating element for heating water from said water reservoir, said first heating element being in thermal communication with said thermal plate for selectively transferring heat through said thermal plate and to both said container and said reservoir; and
a second heating element located downstream from said first heating element, said second heating element positioned adjacent said water supply conduit and selectively heating fluid in said water supply conduit as it is communicated to said shower head;
wherein said first and second heating elements are operable in at least a first mode and a second mode, said second mode being different from said first mode.

2. The coffee maker of claim 1, wherein:
in said first mode said first heating element is in an ON state and said second heating element is in an OFF state.

3. The coffee maker of claim 2, wherein:
in said second mode said first heating element is in said ON state and said second heating element is cycled between said ON state and said OFF state.

4. The coffee maker of claim 3, wherein:
said coffee maker is operable in a third mode wherein in said third mode said first and said second heating elements are continuously in said ON states.

5. The coffee maker of claim 1, further comprising:
a processor electrically coupled to said first heating element and said second heating element and configured to control said first and said second heating elements between an ON state and an OFF sate.

6. The coffee maker of claim 5, wherein:
said processor is configured to control said second heating element in dependence upon said state of said first heating element.

7. The coffee maker of claim 1, wherein:
said second heating element is an extruded aluminum line heater.

8. The coffee maker of claim 1, wherein:
said second heating element is a 200 Watt extruded aluminum line heater.

9. The coffee maker of claim 1, wherein:
said coffee maker is a drip-style coffee maker.

10. A heating system for a coffee maker having a water reservoir and a water supply conduit for distributing water from said water reservoir to a brewing chamber, comprising:
a first heating element for heating water from said water reservoir; said first heating element being in thermal communication with said water reservoir for selectively transferring heat to said water reservoir; and
a second heating element located downstream from said first heating element said second heating element positioned adjacent said water supply conduit and selectively heating fluid in said water supply conduit as it is communicated to said brewing chamber;
wherein said first and second heating elements are operable in at least a first mode and a second mode, said second mode being different from said first mode.

11. The heating system of claim 10, wherein:
in said first mode said first heating element is in an ON position and said second heating element is in an OFF position; and
in said second mode said first heating element is in said ON position and said second heating element is cycled between said ON position and said OFF position during a brewing cycle.

12. The heating system of claim 11, wherein:
said first and second heating elements are operable in a third mode;
wherein in said third mode said first and second heating elements are in said ON position throughout said brewing cycle.

13. The heating system of claim 10, wherein:
said second heating element is an extruded aluminum line heater having a power rating that is less than that of said first heating element.

* * * * *